(12) United States Patent
Ichikawa

(10) Patent No.: US 7,621,200 B2
(45) Date of Patent: Nov. 24, 2009

(54) STEERING WHEEL ADAPTER

(75) Inventor: Yasuaki Ichikawa, Tokyo (JP)

(73) Assignee: Works Bell Inc., Tokyo (JP)

( * ) Notice: Subject to any disclaimer, the term of this patent is extended or adjusted under 35 U.S.C. 154(b) by 0 days.

(21) Appl. No.: 11/939,219

(22) Filed: Nov. 13, 2007

(65) Prior Publication Data
US 2009/0120144 A1 May 14, 2009

(51) Int. Cl.
B62D 1/04 (2006.01)
(52) U.S. Cl. .............. 74/552; 74/555; 74/556; 403/320; 403/374.5; 280/775
(58) Field of Classification Search .......... 74/552, 74/555, 527, 556; 280/775; 403/314, 320, 403/374.5; B62D 1/04
See application file for complete search history.

(56) References Cited

U.S. PATENT DOCUMENTS

| 4,901,544 | A | * | 2/1990 | Jang ........................... 70/218 |
| 5,144,860 | A | * | 9/1992 | Furuhashi et al. ............. 74/552 |
| 5,855,449 | A | * | 1/1999 | Thomas ........................ 74/552 |
| 5,855,451 | A | * | 1/1999 | Milton et al. ................. 74/552 |
| 6,318,756 | B1 | * | 11/2001 | Papandreou ................. 74/552 |
| 2005/0097982 | A1 | * | 5/2005 | Li .............................. 74/552 |

FOREIGN PATENT DOCUMENTS

JP 2003-072559 12/2003

* cited by examiner

Primary Examiner—Richard W L Ridley
Assistant Examiner—Timothy J Murphy
(74) Attorney, Agent, or Firm—Edwards Angell Palmer & Dodge LLP

(57) ABSTRACT

A steering wheel adapter comprises a base having an opening, a plate with a plug formed, and a ring capable of sliding and rotating along the outer face of the base. In the steering wheel adapter, a guide hole penetrating the side face of the base from the outer face into the opening is disposed, a locking member capable of protruding into the opening is provided in the guide hole, and a cam face is provided facing the guide hole on the inner face of the ring. When the ring is slid and rotated in a state where the plate is mounted on the base to insert the plug into the opening, the cam face pushes and protrudes the locking member into the opening, and the locking member is pressed to contact the outer surface of the plug. Consequently, both easy attachment/detachment and prevention of rattle can be achieved.

5 Claims, 12 Drawing Sheets

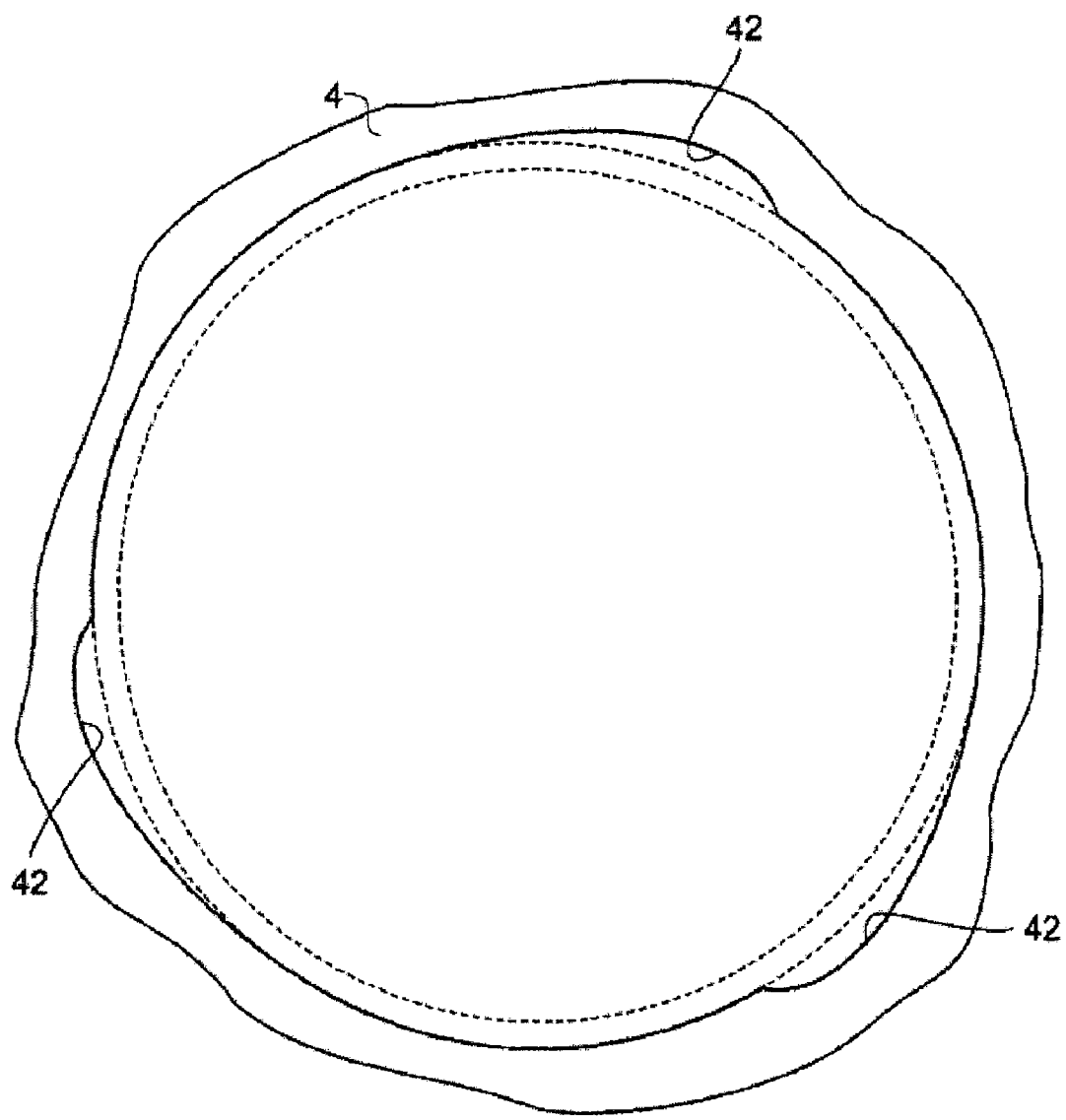

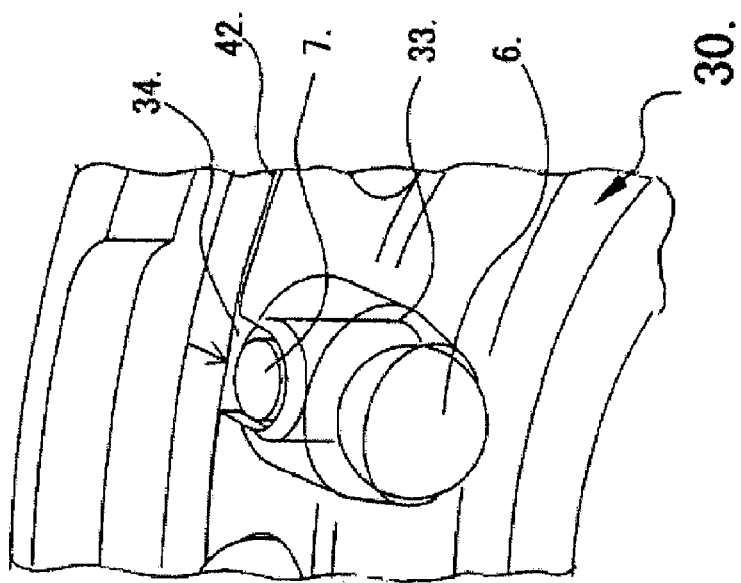
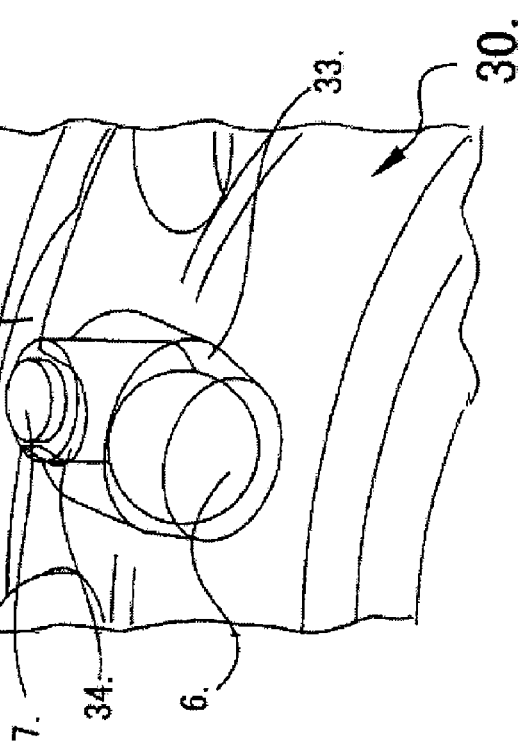
FIG. 7A
FIG. 7B

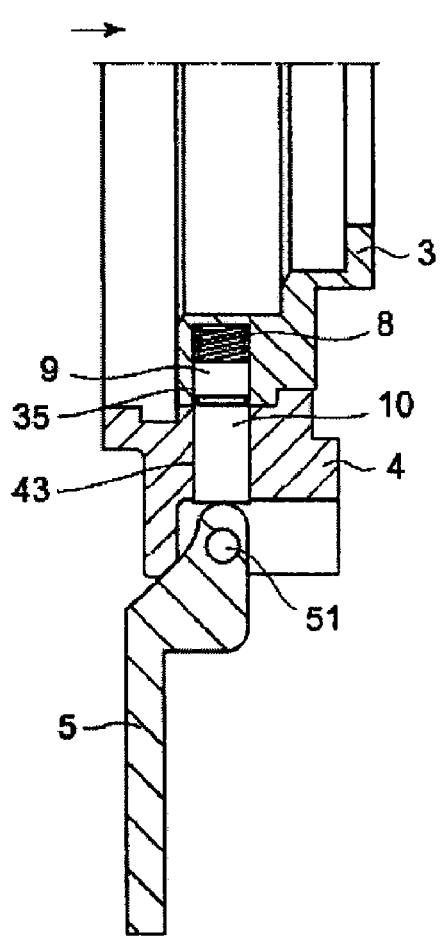 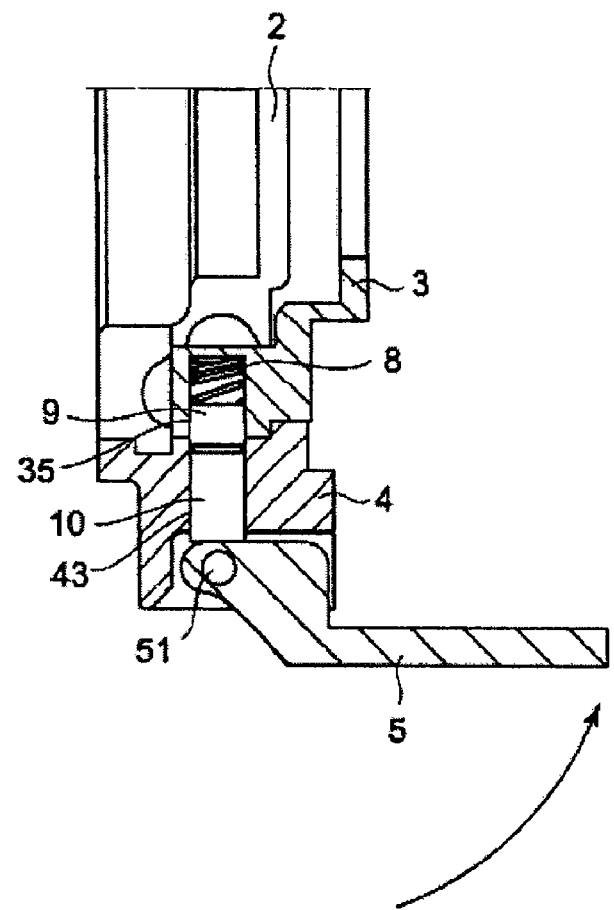

STEERING WHEEL ADAPTER

BACKGROUND OF THE INVENTION

1. Field of the Invention

The present invention relates to an adapter that is interposed between a steering wheel and a boss and that enables attachment and detachment of the steering wheel to and from the boss.

2. Description of the Related Art

Conventionally, one way to prevent vehicle theft is to remove the steering wheel from the boss. In a vehicle such as an automobile, a steering wheel (handle) controlled by a driver is securely attached to a boss that supports a shaft. Because turning the steering wheel controls the vehicle, removing the steering wheel makes it impossible to drive the vehicle.

Thus, in order to facilitate attachment and detachment of the steering wheel, as disclosed in Japanese Unexamined Patent Application Publication No. JP-A 2003-72559, etc., a technique of interposing a steering wheel adapter between a steering wheel and a boss has become prevalent.

A conventional steering wheel adapter comprises a plate attached to a steering wheel, a base attached to a boss, and a ring that covers the periphery of the base. On the contacting faces of the plate and the base, a concave and a convex that can be engaged with each other are disposed, respectively. Moreover, on the plate and the ring, a plurality of protrusions extending in a direction orthogonal to the shaft axis are formed, respectively. When the ring is rotated in a state where the plate is mounted on the base, and the ring-protrusion is located above the plate-protrusion, the plate-protrusion and the ring-protrusion come in contact with each other in the shaft axis direction.

The steering wheel adapter, whose concave and convex are engaged when the plate is mounted on the base, prevents the steering wheel from rotating with respect to the boss. Moreover, by rotating the ring to locate the ring-protrusion above the plate-protrusion, the plate-protrusion and the ring-protrusion come in contact with each other in the shaft axis direction, and the steering wheel is prevented from slipping off from the boss in the shaft axis direction.

Therefore, this steering wheel adapter makes it possible to easily connect the steering wheel to the boss by mounting the plate attached to the steering wheel on the base attached to the boss and rotating the ring. Conversely, when the ring is rotated reversely, the steering wheel can slip off from the boss.

The conventional steering wheel adapter prevents a slip-off in the shaft axis direction by using the protrusions formed on the plate and the ring, as described above. However, in a case where a gap between the plate-protrusion and the ring-protrusion in the shaft axis direction is small, the protrusions hit each other when it is intended to rotate the ring, and a substantial force is required to rotate the ring. Therefore, it has been hard to say that attachment and detachment of the steering wheel is easy for women.

Conversely, in a case where the gap between the plate-protrusion and the ring-protrusion in the shaft axis direction is large, it is easy to rotate the ring to attach and detach the steering wheel. However, it causes the plate to lift up by a length of the gap, and rattle occurs in the shaft axis direction at the time of control of the steering wheel.

SUMMARY OF THE INVENTION

An object of the present invention is to provide a steering wheel adapter that realizes both facilitation of attachment and detachment and prevention of rattle.

The present invention provides a steering wheel adapter that is interposed between a steering wheel and a boss of a vehicle and that enables attachment and detachment of the steering wheel to and from the boss. The steering wheel adapter of the present invention has a base, a plate, a ring, a guide hole, a locking member, and a cam face. The base has an opening, and the boss is attached to a face opposite to the opening. The steering wheel is attached to one face of the plate, and a plug that can be inserted into the opening is formed on the rear face. The ring covers the outer side face of the base, and can slide and rotate along this outer side face. The guide hole penetrates the side face of the base from outside into the opening. The locking member is installed in the guide hole, and can protrude into the opening. The cam face is formed on the inner circumferential face of the ring so as to face the guide hole. In the steering wheel adapter, when the ring is slid and rotated in a state where the plate is mounted on the base with the plug inserted into the opening, the cam face pushes out and protrudes the locking member into the opening, and the locking member presses to contact the outer side face of the plug.

According to the embodiment of the present invention, the steering wheel is easily attached and detached only by rotating the ring forward or backward as the plate is mounted on the base and, in a state where the steering wheel is attached to the boss, the locking member presses to contact the plug to prevent rattle. That is to say, both facilitation of attachment and detachment and prevention of rattle are realized.

The steering wheel adapter may further comprise a press-out assisting member that is interposed between the cam face and the locking member so as to be capable of moving to protrude and withdraw from the outer side face of the base along a penetration direction of the guide hole, and may be configured so that, when the ring is slid and rotated in a state where the plate is mounted on the base with the plug inserted into the opening, the cam face moves the press-out assisting member from a protruding state to a withdrawing state, and movement of the press-out assisting member causes the locking member to protrude into the opening and press to contact the outer side face of the plug.

Since a press-out assisting member prevents the locking member and the cam face from coming in direct contact, the steering wheel adapter need not to be made of a high-rigid steel in order to protect the cam face from being damaged by a pressing force concentrated on a single point between the locking member and the cam face, whereby reduction in weight and facilitation of attachment and detachment of a handle are realized.

The plug may be provided with a curved groove on the outer side face, and the locking member may be fitted into the curved groove.

The press-out assisting member may be a roller that rotates on the cam face in accordance with slide and rotation of the ring. In a case where the press-out assisting member is a roller that rotates on the cam face, rotation of the press-out assisting member prevents the press-out assisting member and other components from colliding with each other, whereby the risk of hindrance of attachment and detachment of the handle is eliminated.

A rotation blocker may be provided to block slide and rotation of the ring on the base.

The rotation blocker may comprise: facing holes that are formed in both the ring and the base and that face each other in a state where the locking member protrudes into the opening; and a pin that is disposed slidable in the facing holes and that is capable of moving to a position where it crosses both the facing holes of the ring and the base and a position where it withdraws into the ring or the base.

The steering wheel adapter may further comprise a lever that is disposed so that it can be set up from a side face of the ring and grasped by an operator, and which, when set up, applies a pressing force with a tip to the pin and withdraws the pin into the base.

The steering wheel adapter may further comprise a lever that is disposed so that it can be set up from a side face of the ring and grasped by an operator.

The steering wheel adapter may further comprise: a groove formed by the same width as the cam face along a circumferential direction of the ring; and a bump that is disposed to the base and protrudes into the groove.

The steering wheel adapter may further comprise: a ring-protrusion protruding and extending into the opening of the base on an inner face of the ring; and a plate-protrusion protruding and extending from an outer face of the plate. The ring-protrusion and the plate-protrusion may come in contact with each other in a shaft axis direction in a state where the locking member protrudes into the opening and presses to contact the outer side face of the plug.

The steering wheel adapter may further comprise: a convex formed on one of contact faces of the plate and the base; and a concave formed on the contact face opposite to the contact face with the convex formed, and may be configured so that the convex and the concave are engaged with each other in a state where the plate is mounted on the base.

BRIEF DESCRIPTION OF THE DRAWINGS

FIGS. 4A and 4B show the states before and after movement, respectively.

FIG. 5A is a top view, and FIG. 5B is a side view.

FIG. 6 is a top view showing an aspect of a cam face.

FIGS. 7A and 7B are magnified schematic views showing movement of a third engagement part. FIG. 7A shows the state before the steering wheel is locked, and FIG. 7B shows the state after the steering wheel is locked.

FIGS. 8A and 8B are partial cross-sectional views of the base and the ring, which are equivalent to a fourth engagement part. FIG. 8A shows a state where rotation is unlocked, and FIG. 8B shows a state where rotation is locked.

DETAILED DESCRIPTION OF THE EMBODIMENT

Figure 1:
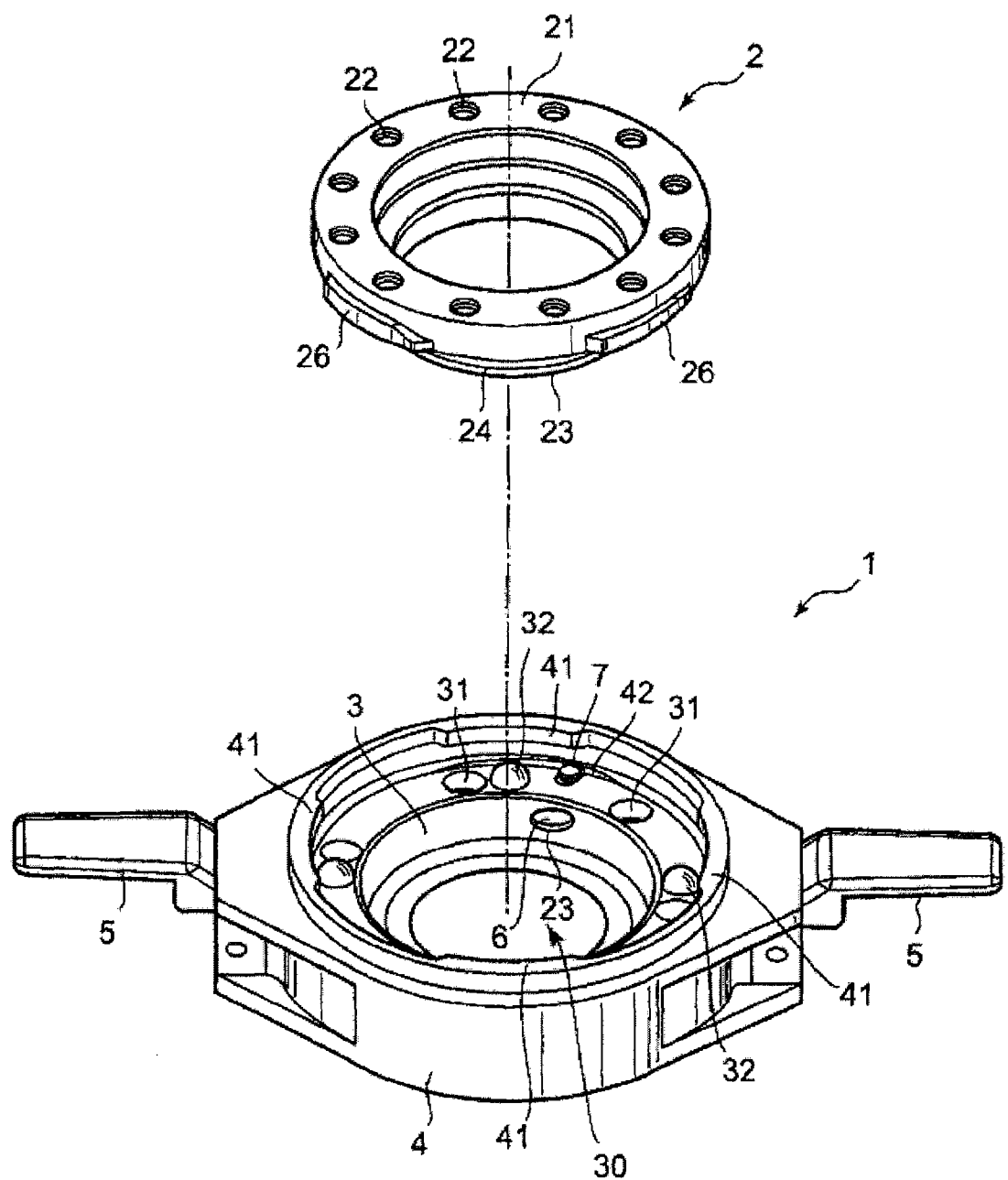
FIG. 1 is a perspective view showing the overall configuration of a steering wheel adapter according to an embodiment of the present invention.

Hereinafter, a preferred embodiment of the steering wheel adapter according to the present invention will be specifically described referring to the drawings.

Figure 2:
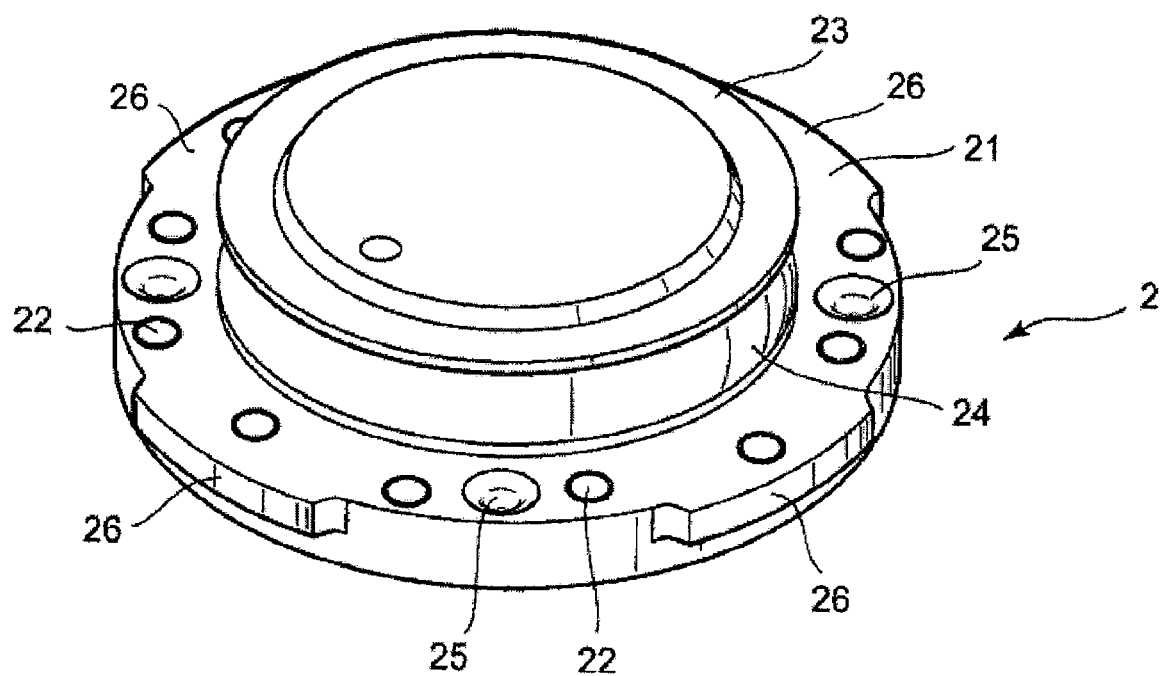
FIG. 2 is a perspective view of a plate, which is a component of the steering wheel adapter, seen from the side of a boss.
Figure 3:
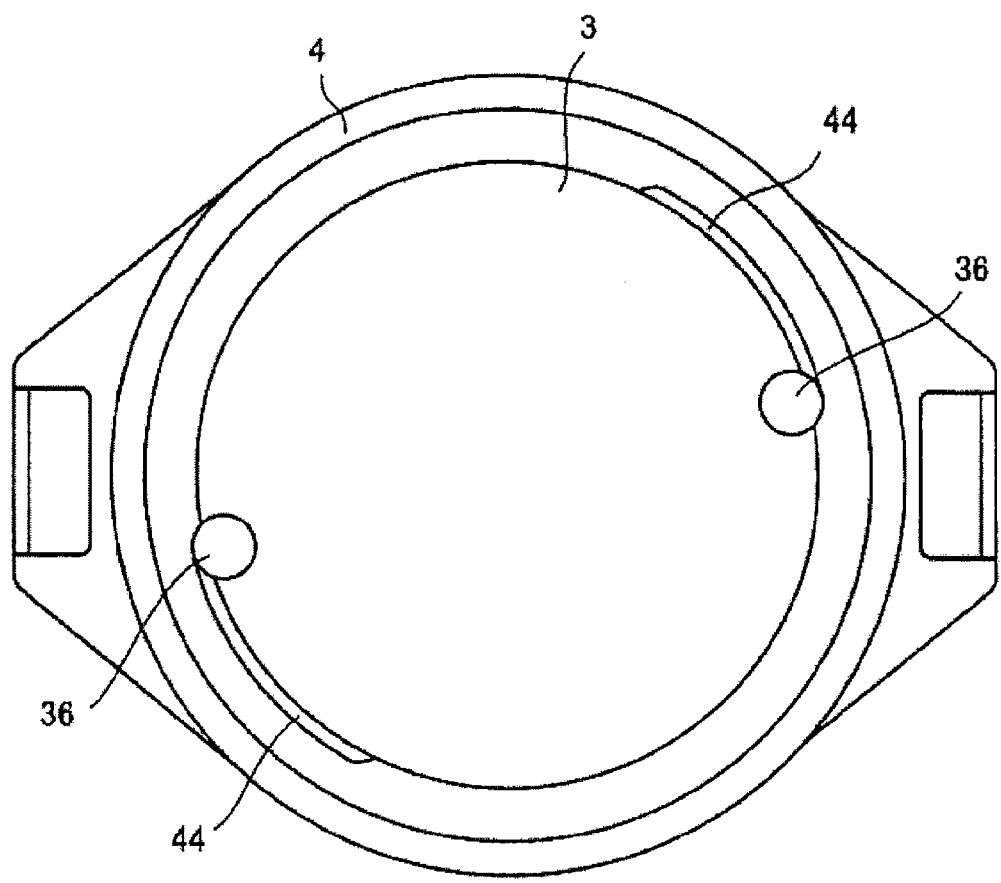
FIG. 3 is a view of a base and a ring seen from the side of the boss.

FIGS. 1 through 3 show the configuration of a steering wheel adapter 1 according to this embodiment. FIG. 1 is a perspective view showing the overall configuration of the steering wheel adapter 1 according to this embodiment. FIG. 2 is a perspective view of a plate 2, which is a component of the steering wheel adapter 1, seen from the side of a boss. FIG. 3 is a view of a base 3 and a ring 4 seen from the side of the boss. In FIG. 3, an opening 30, an attachment hole 31, a lever 5, and so on are not shown for convenience of explanation.

The steering wheel adapter 1 comprises the plate 2, the base 3, and the ring 4. The plate 2 is attached to a steering wheel, and the base 3 is attached to the boss. The ring 4 is disposed covering the outer wall of the base 3. Moreover, the ring 4 is provided with a pair of levers 5 on the outer face thereof. The lever 5 is attached so that it can be set up on the outer face of the ring 4 and pulled down toward the boss.

The steering wheel adapter 1 enables attachment of a steering wheel to a boss in a state where the steering wheel adapter 1 is interposed therebetween, by mounting the plate 2 attached to the steering wheel on the base 3 attached to the boss, and rotating the ring 4 to prevent the plate 2 from slipping off from the base 3.

Conversely, the steering wheel adapter 1 enables detachment of the steering wheel from the boss, by reversely rotating the ring 4 so that the plate 2 can slip off from the base 3.

The steering wheel adapter 1 comprises a first engagement part that, when the plate 2 is mounted on the base 3, prevents the plate 2 from rotating on the base 3. Moreover, the steering wheel adapter 1 comprises second and third engagement parts that, when the lever 5 is set up and the ring 4 is rotated, prevents the plate 2 and the ring 4 from slipping off from each other in the shaft axis direction. The third engagement part securely prevents rattle of the plate 2. Furthermore, the steering wheel adapter 1 comprises a fourth engagement part that, when the lever 5 is pulled down, prevents the ring 4 from rotating. Consequently, it becomes impossible to detach the steering wheel from the boss.

In the steering wheel adapter 1, the plate 2 has a cylindrical shape. The plate 2 has a plate flange 21 extending along the face thereof on the side of the steering wheel. The plate flange 21 has attachment holes 22 pierced at predetermined intervals in the circumferential direction. By making the attachment holes 22 and attachment holes of the steering wheel face each other and fixing with bolts, the plate 2 and the steering wheel are connected.

The base 3 is a cylinder having an opening 30. The base 3 has attachment holes 31. By making the attachment holes 31 and attachment holes of the boss face each other and fixing with bolts, the base 3 and the boss are connected.

The ring 4 is disposed so as to cover the outer circumferential wall of the base 3, when the inner peripheral wall thereof is made in contact with the outer circumferential wall of the base 3. The ring 4 can slide and rotate along the outer wall face of the base 3.

The inner wall of the ring 4 is set so as to be higher than the outer wall of the base 3 toward the steering wheel. Therefore, the steering wheel adapter 1 has a predetermined gap between the brims on the sides of the steering wheel and the opening 30 of the base 3 and the brims on the sides of the steering wheel and the opening 30 of the ring 4.

Further, the plate 2 has, as a plug 23, a portion where the plate flange 21 is not extended, and can be inserted into the opening 30 of the base 3. Therefore, the radius of the plug 23 and the radius of the opening 30 of the base 3 are equal, or the radius of the opening 30 of the base 3 is larger to the extent that rattle does not occur. The length of the plug 23 and the depth of the opening 30 of the base 3 are equal, or the depth of the opening 30 of the base 3 is longer than the length of the plug 23. The plug 23 has a curved groove 24 along its outer wall, as shown in FIG. 2.

When the plate 2 is mounted on the base 3 so that the plug 23 is inserted into the opening 30 of the base 3, the plate flange 21 and the brim of the opening 30 of the base 3 come in contact with each other. On the contact faces of the plate 2 and the base 3, the first engagement part preventing rotation of the plate 2 on the base 3 is formed.

The first engagement part comprises convexes 32 formed on the brim of the opening 30 of the base 3, and concaves 25 formed on a boss-side face of the plate flange 21 shown in FIG. 2. The convex 32 has a hemispherical shape obtained by burying a half of a sphere into the brim of the opening 30, and the concave 25 has a shape dug into a hemisphere. The concave 25 has the same radius as the convex 32, or has a larger radius than the convex 32 to an extent that rattle does not occur. The same numbers of convexes 32 and concaves 25 are disposed in the circumferential direction, respectively, and arrangement intervals and distances from the center are the same.

When the plug 23 is inserted and the plate 2 is mounted on the base 3 so that the plate flange 21 contacts the brim of the opening 30, the convexes 32 of the base 3 are contained into the concaves 25 of the plate 2. When it is intended to rotate the plate 2 on the base 3, the convex 32 contacts the inner wall of the concave 25, and the plate 2 is prevented from rotating on the base 3.

Here, it is also possible to form the concave 25 on the brim of the opening 30 of the base 3, and form the convex 32 on the boss-side face of the plate flange 21.

Further, the plate flange 21 also has four plate-protrusions 26 extending outward in the radial direction from the side face. On the other hand, the ring 4 has four ring-protrusions 41 extending inward in the radial direction from the brim on the side of the steering wheel and from the brim on the side of the opening 30. The plate-protrusions 26 and the ring-protrusions 41 compose the second engagement part.

The plate-protrusions 26 and the ring-protrusions 41 are disposed extending at the same angular intervals. The width in the circumferential direction of the plate-protrusion 26 is the same as the width of a part of the brim of the opening 30 of the ring 4 where the ring-protrusion 41 is not formed, or the width in the circumferential direction of the plate-protrusion 26 is shorter. The radius to the brim of the opening 30 of the part where the ring-protrusion 41 is not formed is the same as or slightly longer than the radius to the tip of the plate-protrusion 26. On the other hand, the radius to the tip of the ring-protrusion 41 is shorter than the radius to the tip of the plate-protrusion 26.

Therefore, when the part of the brim of the opening 30 where the ring-protrusion 41 is not formed is made to face the plate-protrusion 26, the plug 23 can be inserted into the opening 30 of the base 3, and then, the plate 2 can be mounted on the brim of the opening 30 of the base 3. Here, the positions of the concave 25 and the convex 32 and the positions of the plate-protrusion 26 and the ring-protrusion 41 are regulated so that the concave 25 of the plate 2 faces the convex 32 of the base 3 in a state where the brim of the opening 30 where the ring-protrusion 41 is not formed is made to face the plate-protrusion 26.

Then, when the ring 4 is slid and rotated in a state where the plate 2 is mounted on the base 3, the ring-protrusion 41 is located above the plate-protrusion 26. When it is intended to remove the plate 2 in the shaft axis direction in this state, a steering-wheel-side face of the plate-protrusion 26 contacts the boss-side face of the ring-protrusion 41, whereby the plate 2 is prevented from slipping off. For reduction of rattle, it is desired to dispose the plate-protrusion 26 and the ring-protrusion 41 so that, when the plate 2 is mounted on the base 3, the boss-side face of the ring-protrusion 41 is the same in height as or higher than the steering-wheel-side face of the plate-protrusion 26.

The third engagement part is composed of a guide hole 33, a locking member 6, a cam face 42, a press-out assisting member 7, and the plug 23 of the plate 2. The guide hole 33 penetrates from the outer circumferential wall of the base 3 to the inside of the opening 30. The locking member 6 is disposed in the guide hole 33 so as to be slidable within the guide hole 33. The cam face 42 is provided on the inner circumferential wall of the ring 4 facing the guide hole 33. The cam face 42 is provided along the circumferential direction by a width facing the guide hole 33 at all times even if the ring 4 moves within a rotation regulation range. The press-out assisting member 7 is interposed between the cam face 42 and the locking member 6. On the outer circumferential wall of the guide hole 33, a cutout 34 is provided (see FIG. 4). The press-out assisting member 7 is installed in the cutout 34. The press-out assisting member 7 can slide within the cutout 34.

When the ring 4 is slid and rotated in a state where the plug 23 is inserted into the opening 30, the cam face 42 gradually pushes out the press-out assisting member 7 toward the inside of the opening 30, and accordingly, the press-out assisting member 7 pushes out the locking member 6 toward the inside of the opening 30. That is to say, the press-out force of the cam face 42 is conveyed to the locking member 6. Then, the locking member 6 protrudes inside the opening 30 of the base 3 and fits in the curved groove 24 of the plug 23 inserted into the opening 30, and the locking member 6 is pressed to contact the plug 23. By this pressure contact, the plate 2 is pressed against the base 3, whereby the plate 2 is prevented from slipping off in the shaft axis direction, and rattle of the plate 2 is more securely prevented by the pressing force.

As shown in FIG. 3, the rotation regulation range is determined by bumps 36 and regulating grooves 44. The bumps 36 are disposed at two positions on the boss-side face of the base 3 so as to protrude toward the boss-side face of the ring 4. The regulating grooves 44 are formed at two positions on the boss-side face of the ring 4 so that the inner circumferential face is cut away by a predetermined width along the circumference of the ring 4. The bump 36 protrudes inside the regulating groove 44, and the bump 36 can slide within the regulating groove 44.

That is to say, the ring 4 can slide and rotate on the base 3 until the bump 36 comes in contact with a start point or end point of the regulating groove 44. The cam face 42 is provided across a range from a point where the locking member 6 protrudes from the inside of the opening 30 to a point where the locking member can completely withdraw into the opening 30 and, in order to make this range correspond to the guide hole 33, the formation range of the regulating groove 44 is identical to the guide hole 33. The range of the regulating groove 44 is the rotation regulation range, and the formation range of the regulating groove 44 is adjusted so as to be identical to the length of the cam face 42.

FIGS. 4 through 7 show the detailed configuration of the third engagement part. FIGS. 4A and 4B are cross-sectional views showing the arrangement relation of the guide hole 33, the cutout 34, the locking member 6, and the press-out assisting member 7. FIGS. 4A and 4B show the states before and after movement, respectively. FIGS. 5A and 5B are schematic views showing the shape of the press-out assisting member 7. FIG. 5A is a top view, and FIG. 5B is a side view. FIG. 6 is a top view showing an aspect of the cam face 42. FIGS. 7A and 7B are magnified schematic views showing the movement of the third engagement part. FIG. 7A shows a state before the steering wheel is locked, and FIG. 7B shows a state after the steering wheel is locked. These figures do not show the plug 23 for convenience of explanation.

As shown in FIGS. 4 and 7, the cutout 34 is formed by cutting away part of the opening on the side of the outer side face of the guide hole 33. The cutout 34 is rectangular in cross section, and is cut away to a predetermined depth. The guide hole 33 is pierced into a tapered shape becoming smaller inside the opening 30.

The locking member 6 is formed into a sphere whose radius is the same as or slightly smaller than the radius of the curved groove 24 of the plate 2. The press-out assisting member 7, as shown in FIG. 5, is a columnar roller having an axis in the height direction of the base 3 orthogonal to the circumferential direction of the base 3. On each of the upper and lower faces of the roller, a protrusion is disposed. When the protrusions are fitted into the upper and lower brims of the cutout 34, the press-out assisting member 7 is placed within the cutout 34, and is capable of sliding along the depth direction of the cutout 34 while rotating around an axis.

Assuming the locking member 6 is inside the opening 30 and the press-out assisting member 7 is on the outer circumferential face of the base 3, the locking member 6 and the press-out assisting member 7 contact each other in one line from the inner wall of the opening 30 toward the outer circumferential face of the base 3. Therefore, when the press-out assisting member 7 slides within the cutout 34 toward the inside of the opening 30, the locking member 6 is pushed out by the press-out assisting member 7 and moved toward the inside of the opening 30. When the press-out assisting member 7 is located on the outer circumferential side of the base 3, the locking member 6 can move from the inside of the opening 30 toward the outer circumferential side of the base 3, and fully withdraw from the inner circumferential face of the opening 30.

Figure 4A:
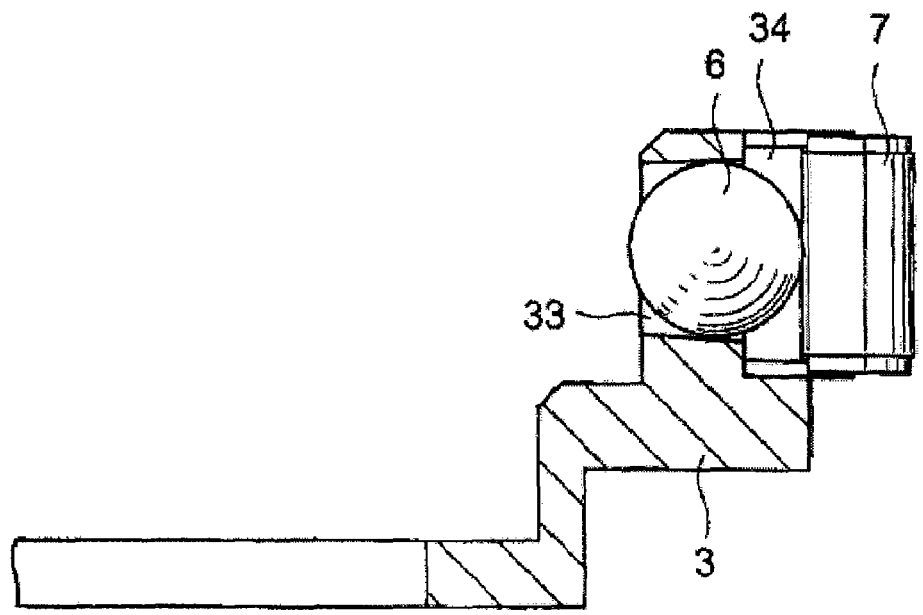
FIGS. 4A and 4B are cross-sectional views showing an arrangement relation of a guide hole, a depression, a locking member, and a press-out assisting member.

As shown in FIG. 4A, the diameters of the locking member 6 and the press-out assisting member 7 and the lengths of the guide hole 33 and the cutout 34 are regulated so that, when the locking member 6 fully withdraws into the wall of the base 3, part of the locking member 6 protrudes inside the cutout 34, and the press-out assisting member 7 protrudes from the outer circumferential face of the base 3.

Figure 4B:
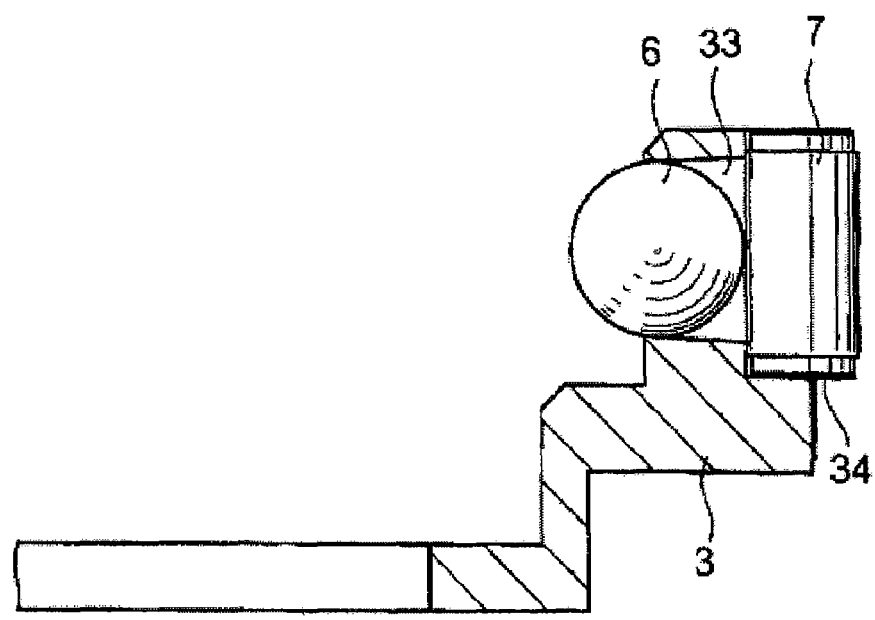
Figure 5A:
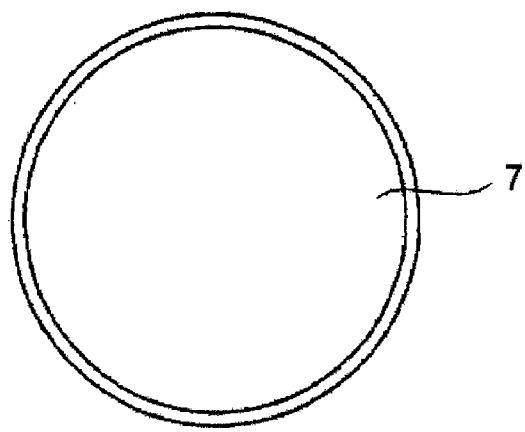
FIGS. 5A and 5B are schematic views showing the shape of the press-out assisting member.
Figure 5B:
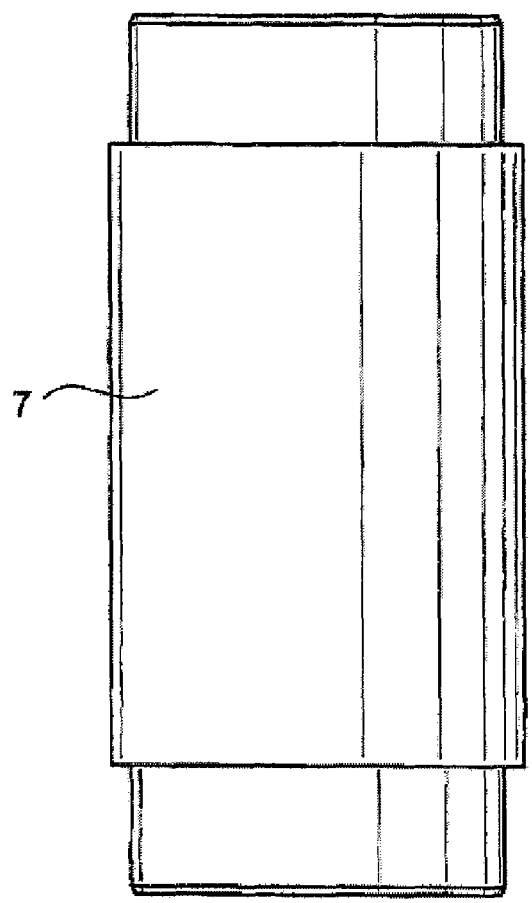

Further, as shown in FIG. 4B, when the press-out assisting member 7 moves within the cutout 34 toward the inside of the opening 30, the press-out assisting member 7 pushes out the locking member 6, and the locking member 6 moves within the guide hole 33 toward the inside of the opening 30. The diameters of the locking member 6 and the press-out assisting member 7 and the lengths of the guide hole 33 and the cutout 34 are regulated so that the press-out assisting member 7 can continue pushing out the locking member 6 until the locking member 6 protrudes into the opening 30. Moreover, the diameter of the press-out assisting member 7 and the length of the cutout 34 are regulated so that the press-out assisting member 7 can continue protruding from the cutout 34 to the outer surface of the base 3 until the locking member 6 protrudes into the inside of the opening 30.

Further, as shown in FIG. 4B, in order to prevent the locking member 6 from slipping off into the opening 30, the radius of the tapered shape of the guide hole 33 is adjusted so that the locking member 6 is blocked by the tapered shape. At least when the locking member 6 is blocked by the tapered shape, a blocked position of the locking member 6 and a distance between the blocked position and the inner wall of the base 3 are regulated so that part of the locking member 6 protrudes inside the opening 30.

That is to say, the sum of the diameters of the locking member 6 and the press-out assisting member 7 is larger than the total length of the guide hole 33. Therefore, when the press-out assisting member 7 withdraws into the outer wall of the base 3, the locking member 6 protrudes inside the opening 30. On the other hand, when the locking member 6 withdraws into the inner wall of the base 3, the press-out assisting member 7 protrudes from the outer wall of the base 3 toward the cam face 42. The deepest part of the cam face 42 is deeper than at least the protrusion length of the press-out assisting member 7.

A combination of the guide hole 33, the cutout 34, the locking member 6, and the press-out assisting member 7 is located at three positions along the circumferential direction of the base 3. As shown in FIG. 6, the cam face 42 is also provided at three positions corresponding to the three guide holes 33.

The cam face 42 is provided so as to become shallower gradually from the deepest part toward the inner circumferential face of the ring 4, and the shallowest part of the cam face 42 abuts on the outer circumferential face of the base 3. The depth of the deepest part of the cam face 42 is the same as or deeper than the protrusion length of the press-out assisting member 7 protruding from the cutout 34 of the base 3 when the locking member 6 fully withdraws into the inner wall of the base 3.

As shown in FIGS. 7A and 7B, when the ring 4 is slid and rotated so as to keep the deepest part of the cam face 42 away from the guide hole 33, the depth of the cam face 42 gradually becomes shallower, so that the distance between the guide hole 33 and the cam face 42 gradually becomes narrower because the depth of the cam face 42 becomes gradually shallower.

Even when the press-out assisting member 7 existing in the cutout 34 protrudes outside the base 3 from the cutout 34, the cam face 42 protrudes and presses out the press-out assisting member. Consequently, the press-out assisting member 7 is pushed into the cutout 34 while rotating on the cam face 42. The press-out assisting member 7 pushed into the cutout 34 moves within the cutout 34 toward the inside of the opening 30 of the base 3.

The locking member 6 contacting the press-out assisting member 7 is pushed into the guide hole 33 by the press-out assisting member 7. The locking member 6 pushed into the guide hole 33 moves toward the inside of the opening 30 of the base 3 within the guide hole 33. Then, the distance between the cam face 42 and the guide hole 33 gradually becomes smaller and, by the time the cam face 42 comes in contact with the outer circumferential face of the base 3, the locking member 6 protrudes inside the opening 30 of the base 3.

When the locking member 6 protrudes into the opening 30 of the base 3 and the plug 23 of the plate 2 is inserted into the opening 30, the locking member 6 is fitted into the curved groove 24 of the plug 23 and is pressed to contact. Therefore, a position to dispose the curved groove 24 is regulated so that the height thereof matches the height of the guide hole 33 when the plate 2 is put on the base 3.

Next, the fourth engagement part preventing the ring 4 from rotating on the base 3 is shown in FIGS. 8A and FIG. 8B. FIGS. 8A and 8B show the cross-sectional views of part of the base 3 and the ring 4 that are equivalent to the fourth engagement part. FIG. 8A shows a state where rotation is unlocked, and FIG. 8B shows a state where rotation is locked.

At an installation site of the lever 5 of the ring 4 is partly cut out toward the center, and a lever pivot 51 is placed between both the sides facing the inner circumference of the cutout. The tip of the lever 5 is inserted into the cutout and a shaft is disposed at the area shifting from the edge of the lever 5 toward the other edge at a fixed interval, and supported by the ring 4. The lever 5 is attached so that it can be set up and pulled down about the lever pivot 5 and is applied so that it can be set up and pulled down while facing the ring.

Further, the lever 5 is configured to have a predetermined thickness at a position where the shaft passes through, and when the lever 5 is pulled down, a distance between a site facing the bottom of the cutout at the position of the lever 5 where the shaft passes through and the bottom of the cutout is kept to a predetermined distance. The predetermined distance is longer than the distance between the tip of the lever 5 and the bottom of the cutout when the lever 5 is set up.

The ring 4 is provided with a hole penetrating from the side face to the center, at an area facing the tip of the lever 5 when the lever 5 is set up on the side face of the ring 4. Further, the base 3 is provided with a hole 35 not penetrating the wall, at a side area facing the hole 43 of the ring 4, in a state where the ring 4 slides and rotates on the outer circumferential face of the base 3 and the locking member 6 protrudes into the opening 30. In other words, in the ring 4 and the base 3, facing holes formed by connecting the holes 43 and 35 in a state where the ring 4 slides and rotates on the outer circumferential face of the base 3 and the locking member 6 protrudes into the opening 30 are disposed.

In each of the holes 43 and 35, a spring 8, a bottom pin 9, and a top pin 10 are placed. The spring 8 is attached to the bottom of the hole 35 of the base 3. The bottom pin 9 is attached onto the spring 8 of the hole 35 of the base 3. The bottom pin 9 can slide within the hole 35 of the base 3 and, when the hole 35 of the base 3 faces the hole 43 of the ring 4, can be across within the hole 35 of the base 3 and the hole 43 of the ring 4. The top pin 10 is placed in the hole 43 of the ring 4. The spring 8 is expandable and retractable within the hole 35 of the base 3. In other words, the bottom pin 9 can be across within the base 3 and the ring 4. The top pin 10 can slide within the hole 43 of the ring 4 and protrude outside from the side face of the ring 4.

The length of the top pin 10 is set so that, when the lever 5 is set up and a spring force of the spring 8 makes the tip of the top pin 10 protrude from the bottom of the cutout and come in contact with the tip of the lever 5, the other edge of the top pin 10 is just on the same plane as the inner circumferential face of the ring 4. In other words, the length of the top pin 10 is the same as the sum of: the distance between the tip of the lever 5 and the bottom of the cutout; and the wall thickness of the ring 4.

In the fourth engagement part, as shown in FIG. 8A, when the lever 5 is set up, the tip of the top pin 10 is in contact with the tip of the lever 5 and the top pin 10 is on the same plane as the inner circumferential face of the ring, whereby the bottom pin 9 is pushed out by the spring force of the spring 8 to the opposite side to the inside of the opening 30, comes in contact with the other end of the top pin 10, and becomes on the same plane as the outer circumferential face of the base 3. That is, the boundary between the top pin 10 and the bottom pin 9 is the boundary between the base 3 and the ring 4. Therefore, the ring 4 can slide and rotate on the base 3.

On the other hand, as shown in FIG. 8B, when the lever 5 is pulled down, the tip of the top pin 10 comes in contact with the side face of the lever 5. Since the distance between the side face of the lever 5 and the bottom of the cutout when the lever 5 is pulled down is longer than the distance between the tip of the lever 5 and the bottom of the cutout when the lever 5 is set up, the other edge of the top pin 10 recedes toward the outer circumferential side of the ring 4 from the inner wall of the ring 4. The bottom pin 9 is pushed out by the spring force of the spring 8 to the opposite side to the inside of the opening 30, thereby coming in contact with the other edge of the top pin 10 and cross within the hole 35 of the base 3 and the hole 43 of the ring 4. That is, the bottom pin 9 crosses within the ring 4 and the base 3. The boundary between the top pin 10 and the bottom pin 9 is exactly the boundary between the base 3 and the ring 4. Therefore, the ring 4 cannot slide and rotate on the base 3.

Figure 9:
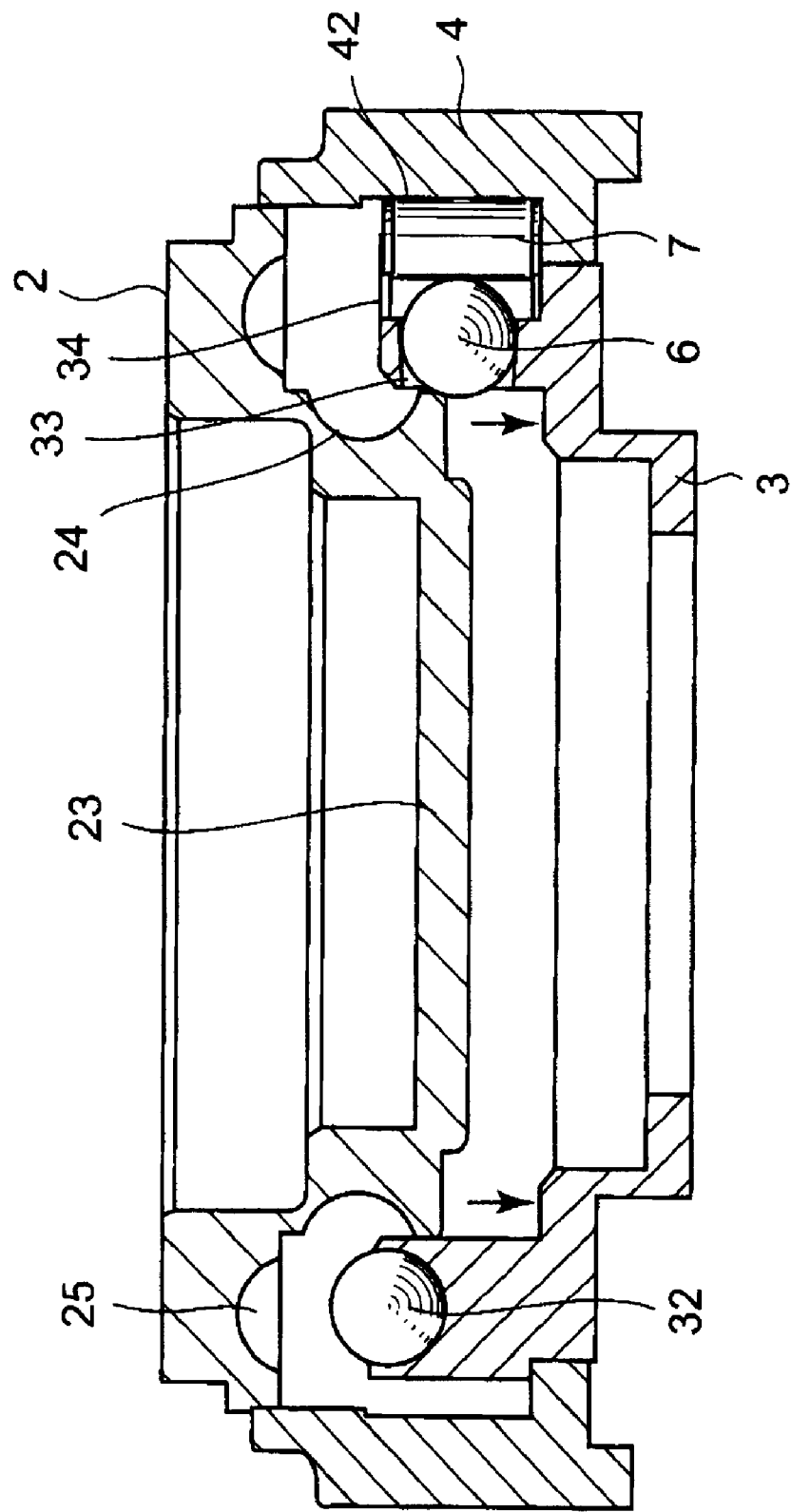
FIG. 9 shows the state of the steering wheel adapter when a plug formed on the plate is inserted into an opening of a base.
Figure 10:
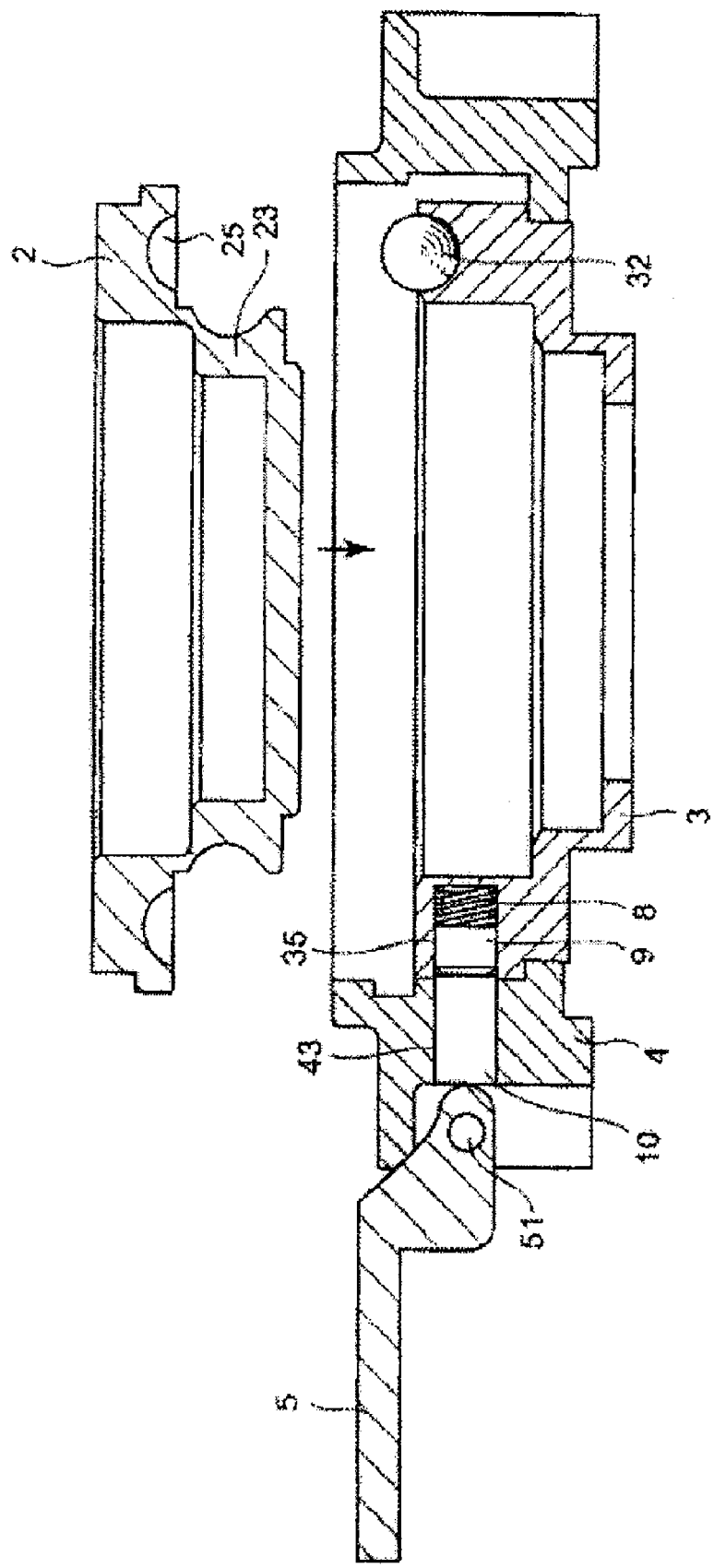
FIG. 10 shows the state of a lever of the steering wheel adapter when the plug formed on the plate is inserted into the opening of the base.
Figure 11:
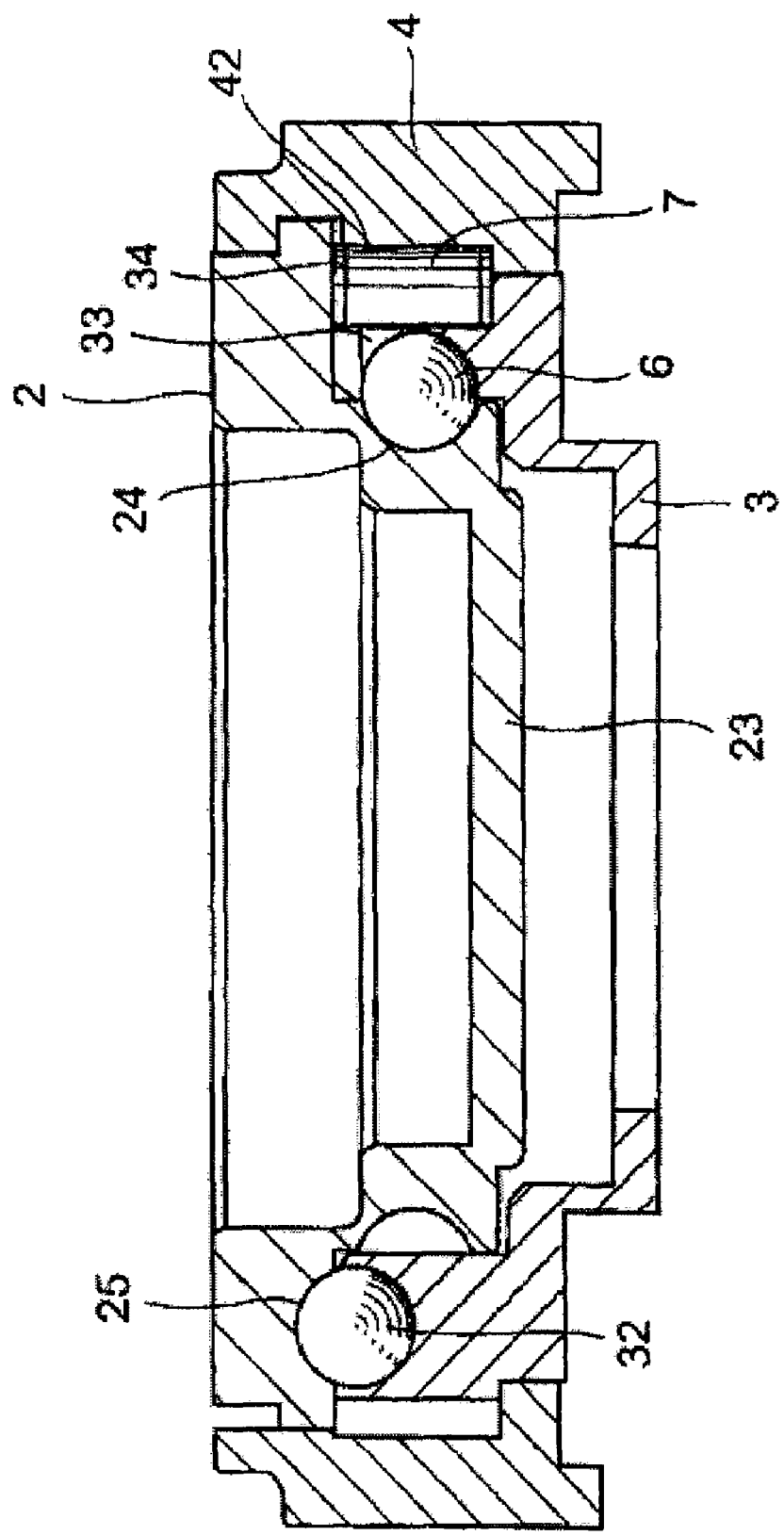
FIG. 11 shows the state of the steering wheel adapter when the plug formed on the plate is inserted and locked in the opening of the base.
Figure 12:
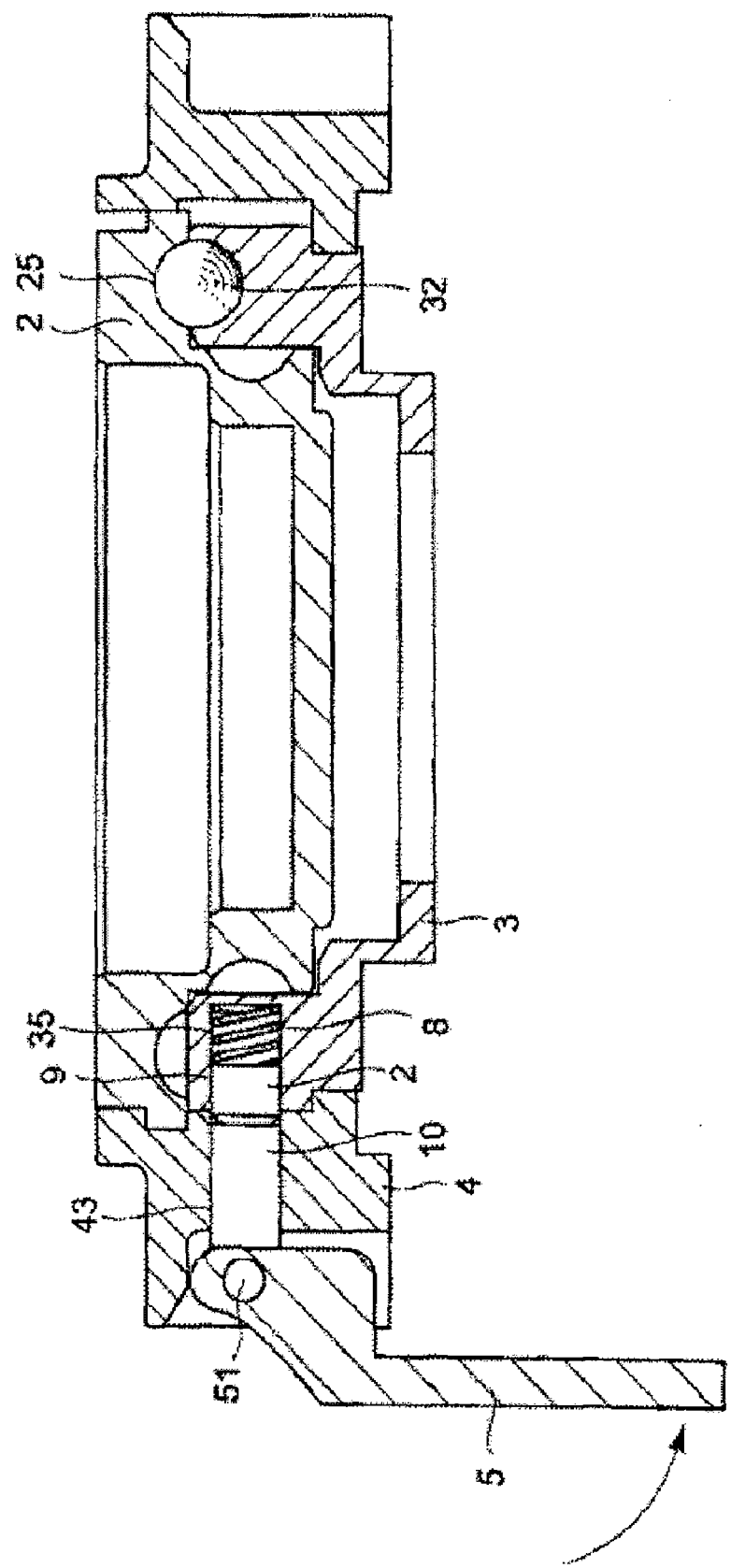
FIG. 12 shows the state of the lever of the steering wheel adapter when the plug formed on the plate is inserted and locked in the opening of the base.

FIGS. 9 through 12 show a method of using the steering wheel adapter 1 having the configuration described above. FIG. 9 shows the state of the steering wheel adapter 1 when the plug 23 of the plate 2 is inserted into the opening 30 of the base 3. FIG. 10 shows a state of the lever 5 of the steering wheel adapter 1 when the plug 23 of the plate 2 is inserted into the opening 30 of the base 3. FIG. 11 shows the state of the steering wheel adapter 1 when the plug 23 of the plate 2 is inserted and locked in the opening 30 of the base 3. FIG. 12 shows a state of the lever 5 of the steering wheel adapter 1 when the plug 23 of the plate 2 is inserted and locked in the opening 30 of the base 3.

First, as shown in FIGS. 9 and 10, in a state where the plate-protrusion 26 of the plate 2 with the steering wheel attached faces a site of the ring 4 where the ring-protrusion 41 is not protruding, the plug 23 of the plate 2 is inserted into the opening 30 of the base 3, and the plate flange 21 is mounted on the brim of the opening 30 of the base 3.

When the plate flange 21 is mounted, the convex 32 of the base 3 is contained into the concave 25 of the plate flange 21, whereby an engagement relation preventing the plate 2 from rotating on the base 3 is made.

For insertion of the plug 23, the ring 4 is rotated in advance so that a site where the cam face 42 faces the guide hole 33 is the deepest part. Because a space where the press-out assisting member 7 can protrude outside the base 3 from the cutout 34 exists between the deepest part of the cam face 42 and the outer circumference of the base 3, even if the locking member 6 is protruding into the opening 30 when the plug 23 is inserted into the opening 30, the locking member 6 is pushed into the guide hole 33 toward the outer circumferential face of the base 3 by the bottom of the plug 23, and is fully withdrawn into the inner wall of the opening 30 of the base 3.

Further, for insertion of the plug 23, the lever 5 is set up on the outer face of the ring 4. When the lever 5 is set up on the outer face of the ring 4, the top pin 10 is pushed into the corresponding hole on the side of the ring 4 until the top pin 10 becomes on the same plane as the inner circumferential face of the ring 4, and the boundary between the top 10 and the bottom pin 9 coincides with the boundary between the ring 4 and the base 3, whereby the ring 4 can rotate on the base 3.

When the plug 23 is inserted, as shown in FIGS. 11 and 12, the set-up lever 5 is grasped and a rotation force is applied to the lever 5, whereby the ring 4 rotates. When ring 4 rotates, the ring-protrusion 41 rotates onto the plate-protrusion 26, whereby an engagement relation between the ring-protrusion 41 and the plate-protrusion 26 with respect to the shaft axis direction is made.

Further, as the ring 4 rotates, the cam face 42 also moves along with the rotation, and a site thereof facing the guide hole 33 gradually becomes closer to the outer circumferential face of the base 3. As the distance between the site of the cam face 42 facing the guide hole 33 and the outer circumferential face of the base 3 becomes narrower, the press-out assisting member 7 is pushed by the cam face 42 to the inside of the opening 30 of the base 3 within the cutout 34 while rotating.

Since the cam face 42 comes in direct contact with the spherical locking member 6 in a case where the press-out assisting member 7 is not provided, the cam face 42 and the locking member 6 come in contact with each other at a single point, and a pressing force is concentrated on the single point, with the result that the cam face 42 may be damaged. However, in a case where a roller having an axis orthogonal to the movement direction of the cam face 42 is interposed between the cam face 42 and the locking member 6, a pressing force is not concentrated on a single point.

Further, in a case where such a press-out assisting member 7 that cannot rotate on the cam face 42 is interposed between the cam face 42 and the locking member 6, a rotation force applied from the cam face 42 to the press-out assisting member may cause galling between the press-out assisting member and the cutout 34. However, in a case where a roller rotating on the cam face 42 is employed as the press-out assisting member 7, a rotation force applied from the cam face 42 to the roller is converted into rotation of the roller, and the galling is prevented. Therefore, it is preferable to use a roller as the press-out assisting member 7.

As the press-out assisting member 7 is pushed in while rotating on the cam face 42, the press-out assisting member 7 pushes out the locking member 6 to the inside of the opening 30 of the base 3. By the time the cam face 42 and the outer circumferential face of the base 3 come in contact with each another during rotation of the ring 4, the locking member 6 protrudes inside the opening 30 of the base 3.

When the locking member 6 protrude inside the opening 30 of the base 3, the locking member 6 fits into the curved groove 24 on the plug 23 inserted into the opening 30, and the locking member 6 presses to contact the plug 23. The pressing force of the locking member 6 also becomes a force of pressing the plate 2 against the base 3 via the curved groove 24, thereby preventing the plate 2 from slipping from the base 3 and more surely preventing rattle of the plate 2 on the base 3.

In a state where the concave 25 of the plate 2 and the convex 32 of the base 3 are engaged with each another, the ring-protrusion 41 and the plate-protrusion 26 are engaged with each another, and the locking member 6 and the plug 23 are engaged with each another, the lever 5 is pulled down with respect to the side face of the ring 4.

When the lever 5 is pulled down with respect to the side face of the ring 4, the distance between the lever 5 and the bottom of the cutout increases, and the top pin 10 recedes back from the hole 35 of the base 3 so as to protrude to the outer circumferential face of the ring 4. When the top pin 10 recedes back from the hole 35 of the base 3, a spring force of the spring 8 makes the bottom pin 9 move to a position to cross within the ring 4 and the base 3. Therefore, the bottom pin 9 prevents the ring 4 from rotating on the base 3, and makes the ring 4 incapable of rotating.

The locking operation of the steering wheel adapter 1 keeps blocking rotation of the plate 2 on the base 3, namely, rotation of the steering wheel on the boss. Moreover, the locking operation also keeps blocking slip of the plate 2 from the base 3 in the shaft axis direction, namely, slip of the steering wheel from the boss. Moreover, the locking operation also keeps blocking rattle of the plate 2 on the base 3, namely, rattle of the steering wheel on the boss.

To detach the steering wheel from the boss, a reverse operation to the locking operation is performed. That is, the lever 5 is set up on the side face of the ring 4 at first, and the boundary between the top pin 10 and the bottom pin 9 is aligned with the boundary between the ring 4 and the base 3, whereby the ring 4 and the base 3 are made to be rotatable. Then, by grasping the lever 5 and applying a reverse rotation force to the force generated in the locking operation, the ring 4 is reversely rotated.

When the ring 4 reversely rotates, the area of the cam face 42 facing the guide hole 33 becomes the deepest part, where the locking member 6 can be withdrawn into the wall of the base 3. By grasping the steering wheel in this state and pulling the steering wheel in the opposite direction to the boss, the locking member 6 receives a pressing force of the outer circumferential face of the base 3 from the boss-side face of the curved groove 24, and moves within the guide hole 33 to be withdrawn into the wall of the base 3. Consequently, the engagement relation between the plug 23 and the locking member 6 is dissolved.

Furthermore, the ring-protrusion 41 leaves from the plate-protrusion 26, whereby the engagement relation between the protrusion of the ring 4 and the plate-protrusion 26 is dissolved.

Accordingly, by pulling the steering wheel in the opposite direction to the boss, the plate 2 leaves from the base 3, and the steering wheel is detached from the boss.

In this way, according to the steering wheel adapter 1 of this embodiment, only by normally or reversely rotating the ring in a state where the plate 2 is mounted on the base 3, the steering wheel can be easily attached or detached.

When the steering wheel is attached, the locking member 6 presses to contact the plug 23 in a state where the locking member 6 is fitted into the curved groove 24 of the plug 23, so that it is possible to press the plate 2 onto the base 3 to prevent rattle.

Further, the press-out assisting member 7 avoids direct contact of the locking member 6 and the cam face 42, so that it is not necessary to make the steering wheel adapter 1 with a high-stiffness steel, in order to protect the cam face 42 from being damaged due to a pressing force of the locking member 6 and the cam face 42 exerted on a single point between the locking member 6 and the cam face 42, thereby achieving the reduction in weight and easy attachment and detachment.

What is claimed is:

1. A steering wheel adapter that is interposed between a steering wheel and a boss of a vehicle and that enables attachment and detachment of the steering wheel to and from the boss, the steering wheel adapter comprising:
   a base having an opening, the boss being attached to a face of the base opposite the opening;
   a ring that covers an outer side face of the base and that is capable of sliding and rotating along the outer side face;
   a guide hole penetrating the side face of the base from outside to the inside of the opening;
   a cam face formed on an inner circumferential face of the ring so as to face the guide hole;

a locking member that is installed in the guide hole and that is capable of protruding into the opening by a press-out force generated by the cam face in accordance with slide and rotation of the ring;

a plate, to one end of which the steering wheel is attached;

a plug that is formed on a face opposite to the one face of the plate and inserted into the opening of the base, and an outer side face of which is pressed to contact the locking member protruding into the opening; and a press-out assisting member that is interposed between the cam face and the locking member so as to be capable of moving to protrude and withdraw from the outer side face of the base along a penetration direction of the guide hole, and that conveys the press-out force generated by the cam face to the locking member, wherein the press-out assisting member is a roller rotating on the cam face in accordance with slide and rotation of the ring.

2. The steering wheel adapter according to claim 1, further comprising:

a rotation blocker configured to block slide and rotation of the ring on the base, wherein the rotation blocker comprises:

facing holes that are formed in both the ring and the base and that face each other in a state where the locking member protrudes into the opening; and a pin that is disposed slidable in the facing holes and that is capable of moving to a position where it crosses both the facing holes of the ring and the base and a position where it withdraws into the ring or the base.

3. The steering wheel adapter according to claim 2, further comprising:

a lever that is disposed so as to be capable of setting up from a side face of the ring and grasped by an operator, and which, when sets up, applies a pressing force with a tip to the pin to withdraw the pin into the base.

4. The steering wheel adapter according to claim 1, further comprising:

a groove formed with the same width as the cam face along a circumferential direction of the ring; and a bump that is disposed on the base and that protrudes into the groove.

5. The steering wheel adapter according to claim 1, further comprising:

a ring-protrusion protruding and extending in the opening of the base on an inner face of the ring; and a plate-protrusion protruding and extending from an outer face of the plate, wherein the ring-protrusion and the plate-protrusion come in contact with each other in a shaft axis direction in a state where the locking member protrudes into the opening and presses to contact the outer side face of the plug.

* * * * *